United States Patent
Black

[19]

[11] Patent Number: 5,826,375
[45] Date of Patent: Oct. 27, 1998

[54] MODULAR PLANTER SYSTEM

[76] Inventor: Alan Black, 173 Tower Drive, Scarborough, Ontario, Canada, M1R 3P6

[21] Appl. No.: 660,253

[22] Filed: Jun. 7, 1996

[51] Int. Cl.$^6$ .............................. A01G 9/02; A47G 7/02
[52] U.S. Cl. ................................. 47/67; 47/82; 47/83
[58] Field of Search ............... 47/39, 65.5, 67, 47/82, 83, 86

[56] References Cited

U.S. PATENT DOCUMENTS

| | | | |
|---|---|---|---|
| 4,170,844 | 10/1979 | Steele | 47/39 X |
| 4,295,296 | 10/1981 | Kinghorn | 47/82 |
| 4,380,136 | 4/1983 | Karpisek | 47/83 |
| 4,561,208 | 12/1985 | Schultz | 47/83 |
| 4,614,056 | 9/1986 | Farkas | 47/67 |
| 4,676,023 | 6/1987 | Mori | 47/82 |
| 4,896,456 | 1/1990 | Grant | 47/67 |
| 5,367,823 | 11/1994 | Ferris | 47/39 |
| 5,502,922 | 4/1996 | Shlomo | 47/39 X |

FOREIGN PATENT DOCUMENTS

| | | | |
|---|---|---|---|
| 2070161 | 2/1993 | Canada . | |
| 445320 | 9/1991 | European Pat. Off. | 47/39 |
| 2386981 | 12/1978 | France | 47/82 |
| 3835787 | 4/1990 | Germany | 47/83 |
| 8401089 | 11/1985 | Netherlands | 47/39 |
| 1678252 | 9/1991 | U.S.S.R. | 47/82 |
| 2248176 | 4/1992 | United Kingdom | 47/82 |

*Primary Examiner*—John A. Ricci
*Attorney, Agent, or Firm*—Bereskin & Parr

[57] ABSTRACT

A modular planter system comprising: a plurality of troughs having a drainage conduit extending vertically upwards and downwards from the bottom of the trough; a reservoir, a support member between adjacent troughs; kit for assembling the modular planter system.

21 Claims, 13 Drawing Sheets

MODULAR PLANTER SYSTEM

FIELD OF THE INVENTION

The present invention relates to a modular system for creating a generally vertical garden for growing plants.

BACKGROUND OF THE INVENTION

When growing and displaying plants, it is sometimes desirable to arrange the plants in a vertically extending garden. For example, a vertically extending garden may be desired for effectively displaying a number of plants to provide a pleasing or striking display, or to cover a bare wall, fence, or the like. On other occasions it may be desirable to arrange plants vertically for efficiency of growing, for example, to minimize the floor space used or to maximize the plant's exposure to light. Furthermore, it may be desirable for a number of aesthetic or functional reasons to be able to rearrange or replace individual plants or otherwise alter the arrangement of plants.

The prior art reveals several types of modular planters. U.S. Pat. No. 4,561,208 (Schultz) discloses a modular planter system including three or more pot housings each capable of receiving a plant pot. One or more connecting members is attached to each of the pot housings. The pot housings have hollow interiors to permit them to be filled with water. Plant pots received within the housings are fed water by means of a wick.

U.S. Pat. No. 4,896,456 (Grant) discloses a plant support system for growing plants against a vertical wall. The system comprises an integrally formed member with an elongate support portion and a U-shaped hook portion which fits freely and removably about an upper horizontal portion of a wall. The elongate support portion has a plurality of openings which receive hooks affixed to soil receiving receptacles.

One disadvantage with Schultz and Grant is that each housing or receptacle must be individually watered and accordingly it may be time consuming, depending on the number of housings or receptacles which are used, to routinely monitor and water all of the plants planter.

U.S. Pat. No. 4,380,136 (Karpisek) discloses an assembly kit for a holder for growth supporting medium. The kit comprises vertically extending posts with openings therein to receive a plurality of vertically disposed planters. When assembled, the assembly sits on a bottom member which contains a reservoir. Water is added to the top planter and flows down through the planters sequentially to the reservoir where the excess water may accumulate.

U.S. Pat. No. 4,614,056 (Farkas) discloses a planter which is vertically stackable and is adapted to be positioned directly above and/or below other similar planters. A dish is provided adjacent the bottom of the lowest positioned planter to act as a water reservoir. Each planter has an upper portion containing a plurality of semi-conical regions extending outwardly from the planter to provide planting regions for receiving plants. Drain holes are provided in each planter to permit water to drain through each planter to the bottom dish.

One disadvantage of Karpisek and Farkas is that the water removes or "washes out" the nutrients from the upper planters towards the lower planters and the reservoir. Further, by positioning planters one on top of another, only a portion of the top of each planter is available for receiving and growing plants.

Canadian Application No. 2,070,161 (Chen) discloses a planter system comprising a plurality of planters adapted to be vertically stacked. Each planters has an area for receiving plants. The planter system may have upper and lower reservoirs and a water circulating pump positioned in the top reservoir.

U.S. Pat. No. 4,295,296 discloses a vertical garden assembly comprising a plurality of open top troughs, one positioned above another. A separate horizontal distribution conduit is positioned above each trough and a container adapted to be filled with water is disposed above the troughs. A separate tube connects the bottom of the container to each of the conduits. The troughs have drain apertures in their bottom positioned to drain each trough away from their respective lower troughs. One disadvantage with this system is that, as each trough is supplied from a common source and individually drained, care must be taken to ensure that each trough receives sufficient water.

SUMMARY OF THE INVENTION

In accordance with the instant invention a modular planter system comprises:

(a) a plurality of longitudinally extending troughs, each of the troughs having a top, a bottom surface, first and second opposed longitudinally displaced sides, drainage aperture means and reservoir means for storing liquid;

(b) support means for positioning the troughs one above another to form a substantially vertically extending series of troughs;

(c) conduit means for connecting in flow communication the drainage aperture means of each of the troughs with the reservoir means of the immediately lower trough.

In accordance with another embodiment of the invention, a kit for assembling at least one modular planter system comprises:

(a) a plurality of longitudinally extending troughs, each of said troughs having a top, a bottom surface, first and second opposed longitudinally displaced sides, drainage aperture means and reservoir means for storing liquid;

(b) support means for positioning the troughs one above another to form a substantially vertically extending series of troughs wherein, when the kit is assembled, the bottom surface of each trough is spaced above the top of the immediately lower trough so that plants may grow upwardly from any position in each of said troughs;

(c) conduit means for connecting in flow communication the drainage aperture means of each of the troughs with the reservoir means of the immediately lower trough.

One advantage of the instant invention is that by utilizing conduit means for connecting in flow communication the drainage aperture means of each of the troughs with the reservoir means of the immediately lower trough, the delivery and retention of a volume of nutrients and water may be uniform among each trough. Further, this arrangement reduces the loss of nutrients and other growth medium through washing out as all of the water does not flow sequentially downwardly from one trough to the next troughs. Instead, the water fills each reservoir sequentially with the excess water in each trough being used to fill the reservoir of the next lower trough.

In one embodiment, the conduit means has a first end in flow communication with the drainage aperture of a first trough and a second end in flow communication with the reservoir of the immediately lower trough, and the drainage aperture is positioned to allow the reservoir of the first trough to at least partially fill prior to the liquid media passing through the drainage aperture. In a preferred embodiment, the lower portion of the conduit extends proximal to or below the top of a second trough below.

The bottom surface of each trough is preferably spaced sufficiently above the top of the immediately lower trough so that the selected plants may grow upwardly or outwardly or upwardly and outwardly from any position in each of the troughs. The number of troughs, and the space between troughs may be changed, according to the amount of planting space required. It will be appreciated that the troughs are spaced a sufficient distance apart so that plants may be planted across the entire surface thereof.

In another embodiment, the drainage aperture of the first trough is positioned adjacent one of the longitudinally displaced sides and the drainage aperture of the immediately lower trough is positioned adjacent the other of the longitudinally displaced sides. This assists in ensuring that each reservoir is filled or substantially filled prior to the water passing to the next lower trough.

The modular planter system may also comprise a plurality of plant containers and each of the troughs is accordingly sized to receive at least one plant container. Each of the plant containers has at least one drainage aperture for connecting the plant containers in flow communication with the reservoir of the trough in which at least one plant container is received. This embodiment facilitates the removal and replacement of plants when required for repositioning the plants or replacing plants which may die.

The modular planter system may also comprise a hanging means for supporting the modular planter system above a surface. Thus, the planter, according to the present invention, is suitable for use in a hanging position. Alternately, the modular planter system could also be mounted, for example, on a wall, if desired.

Accordingly, the modular system of this invention allows plants to be arranged in a flexible, vertical garden without the disadvantages of wash out during the irrigation of the plants. Furthermore, the modular system of this invention may be assembled from a kit. The individual components of the kit may may be constructed with a size and weight such that the components are easily handled by an individual.

BRIEF DESCRIPTION OF THE DRAWINGS

These and other advantages of the present invention will be more fully and particularly understood in conjunction with the following description of the following drawings of preferred embodiments of the invention in which.

DETAILED DESCRIPTION OF A PREFERRED EMBODIMENT

Figure 1:
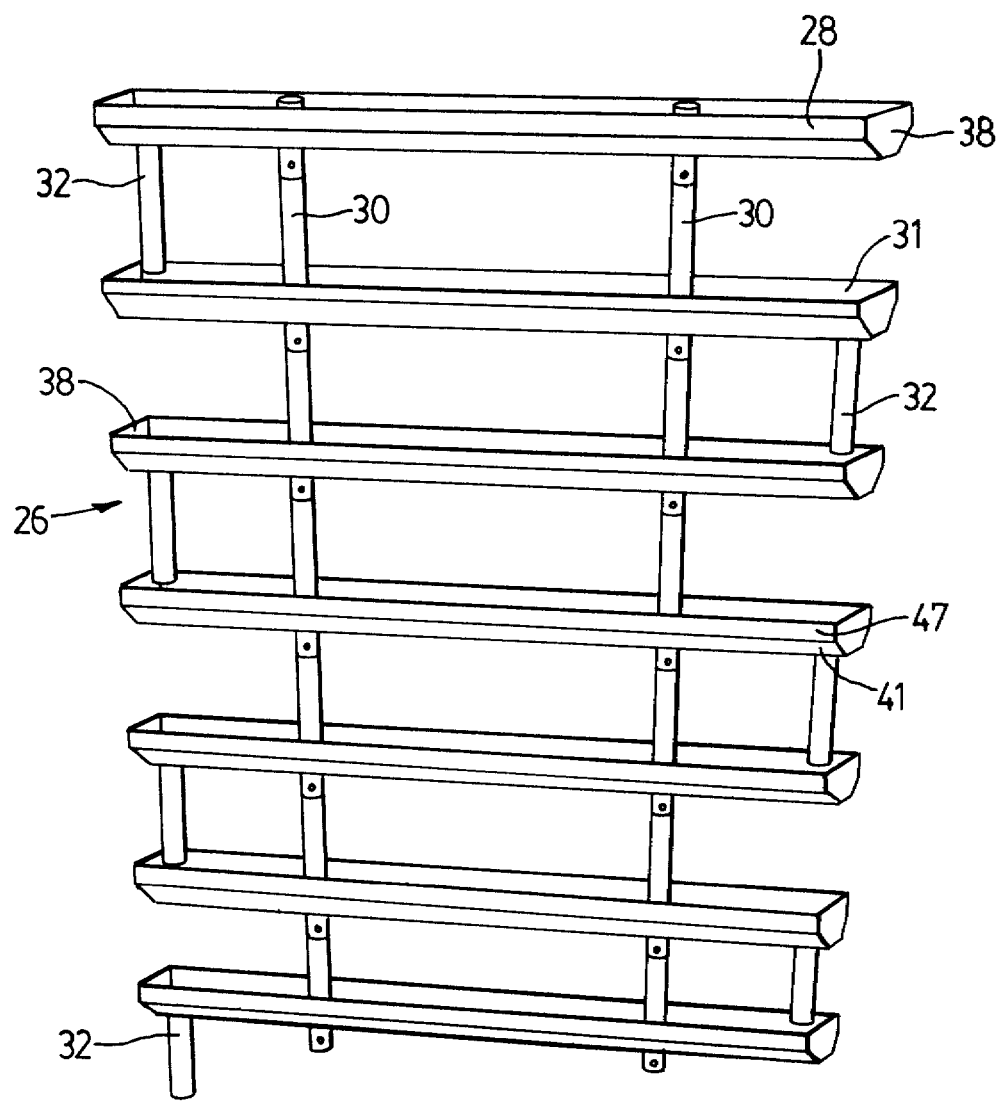
FIG. 1 is a front perspective view of a modular planter system of the present invention.

For the purposes of promoting and understanding of the principles of the invention, reference will now be made to the embodiments illustrated in the drawings and specific language will be used to describe the same.

As shown in FIG. 1 a modular planter system comprises a series of troughs 28 positioned one above another by means of support means 30, conduit means 26 extending from each trough 28 to the next lower trough 28 for draining excess liquids and materials from a first trough 28 to the next lower trough 28 and support means 30 for positioning troughs 28 one above the other to form a substantially extending vertically extending series of toughs 28. As shown in the preferred embodiments of FIGS. 2 and 3, plant containers 20 may be provided for seating in troughs 28.

Figure 2:
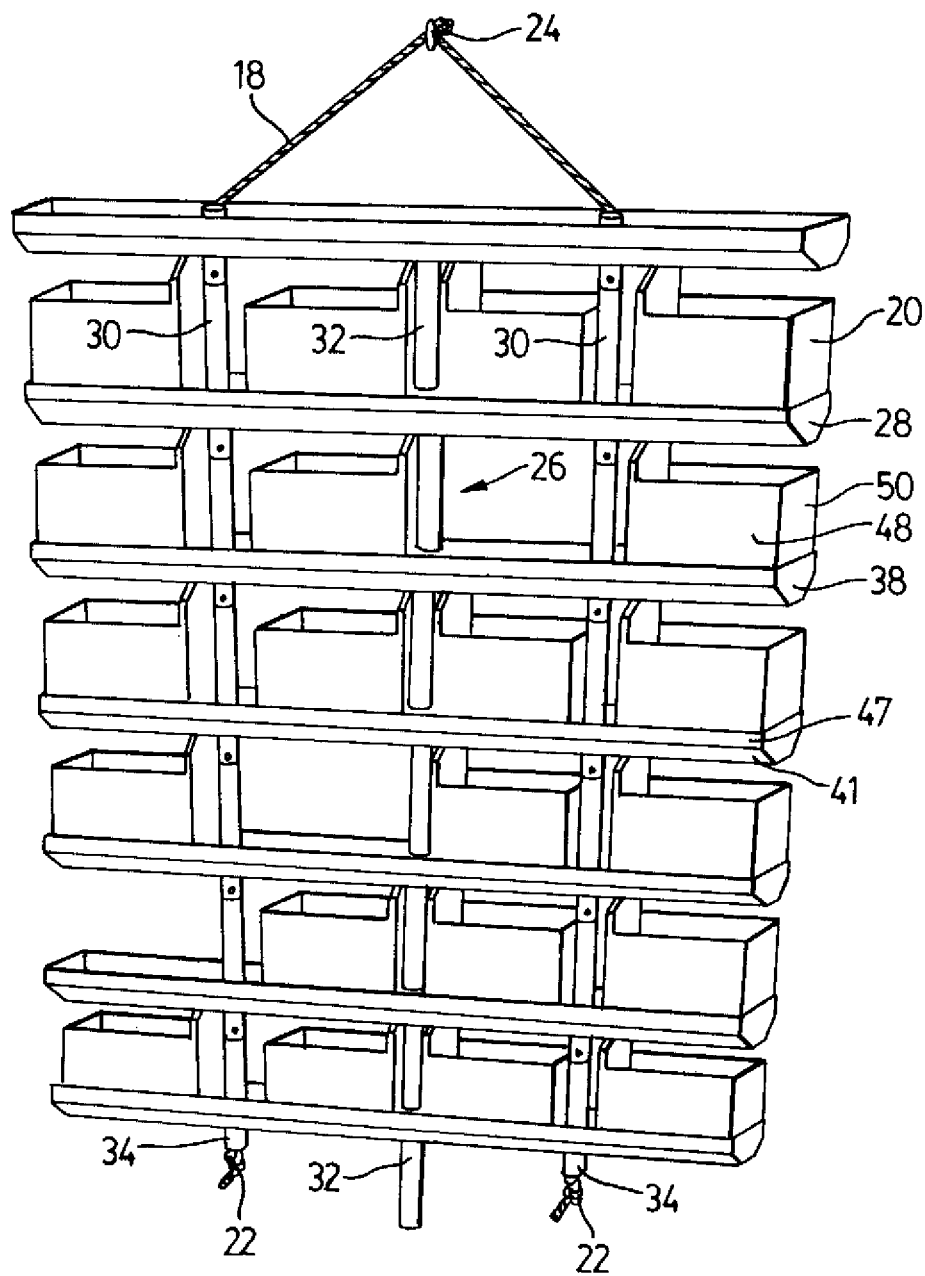
FIG. 2 is a front perspective view of a second embodiment of the modular planter system of the present invention.
Figure 3:
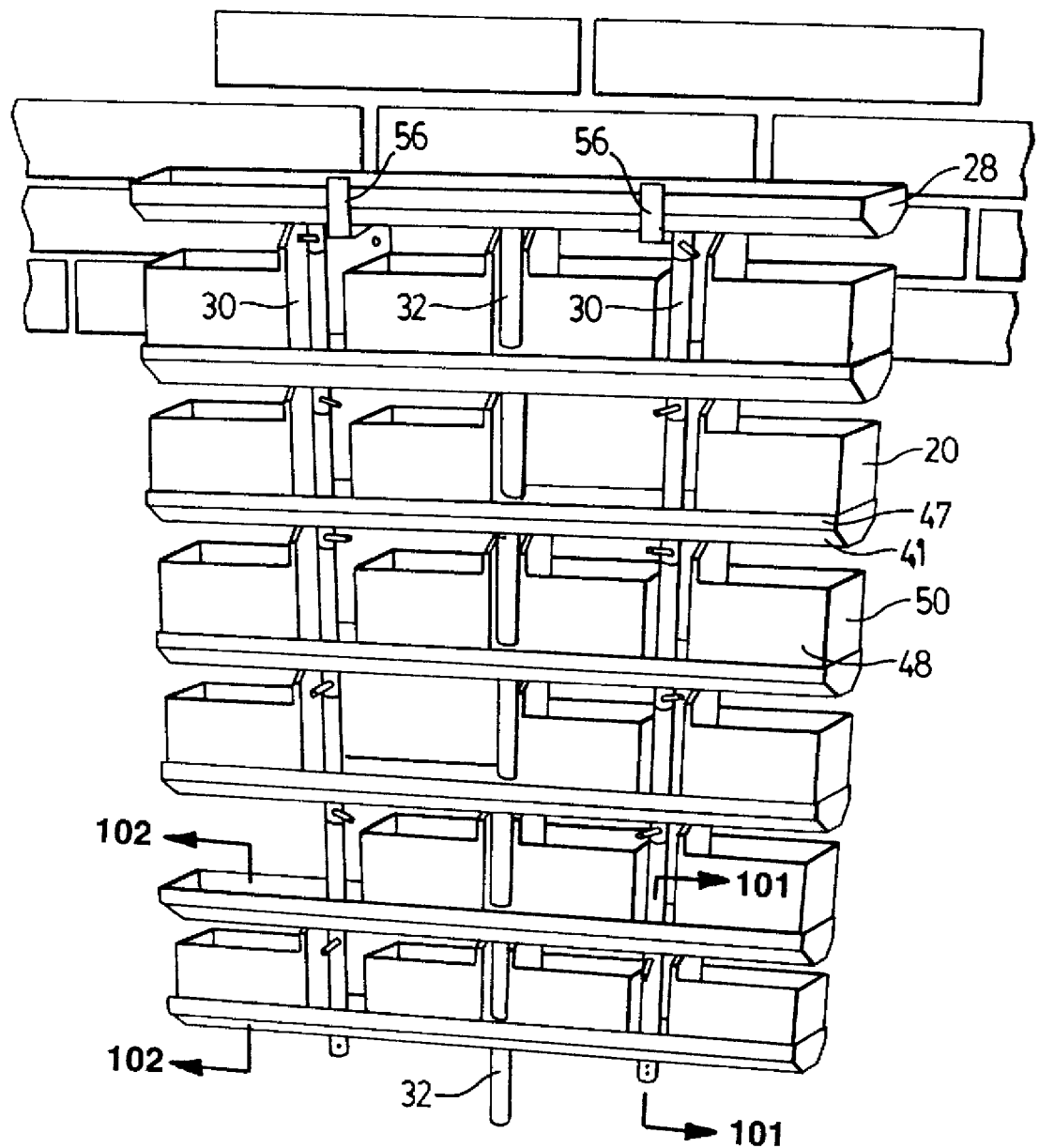
FIG. 3 is a front perspective view of a third embodiment of the modular planter system of the present invention.

Trough 28 is sized to grow at least one plant or to receive at least one plant container 20. As shown in FIG. 1, trough 28 may be a longitudinally extending member which is adapted to grow one or more plants. If the modular planter system comprises plant containers 20 as shown in FIGS. 2 and 3, then each trough 28 may be sized to receive one or more plant containers 20.

Figure 4:
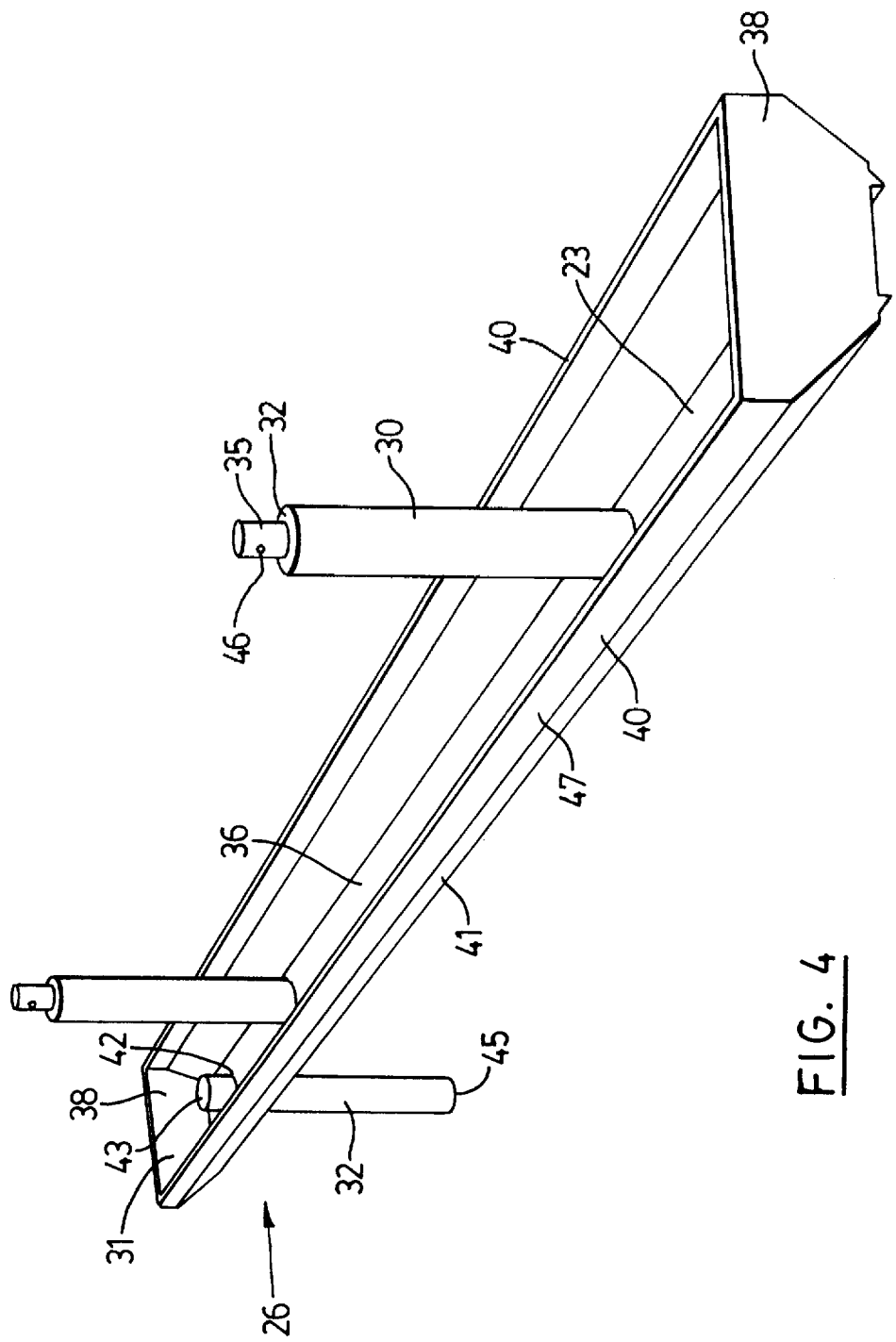
FIG. 4 is a perspective view of a trough of FIG. 1.
Figure 6:
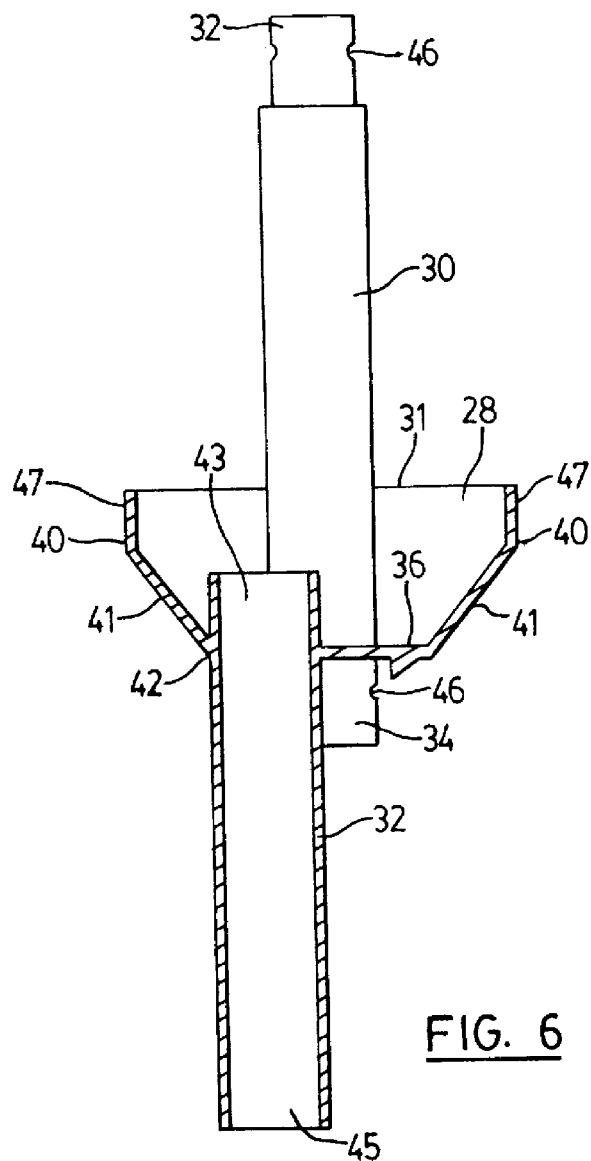
FIG. 6 is a cross-sectional view of the trough of FIG. 5 taken along the line A—A.

Referring to FIGS. 4 and 6, trough 28 may have top 31, bottom surface 36, longitudinally extending sides 40, end walls 38, drainage aperture 42, and reservoir 23 for storing liquid media. Sides 40 of troughs 28 may have diagonal surfaces 41 which extend upwardly and outwardly from bottom surface 36 and vertical surfaces 47 which extend upwardly from diagonal surface 41 to top 31. Thus, top 31 is wider than bottom surface 36. It will be appreciated that the size of longitudinally extending sides 40 may be varied and that the angles at which diagonal surface 41 meets vertical surface 47 may be varied, so long as the trough may be adapted to receive one or more plants or plant containers 20. Furthermore, it will be appreciated that in other embodiments, longitudinally extending side 40 may comprise vertical surface 47 without a diagonal surface 41 (not shown), or alternately, longitudinally extending side 40 may comprise diagonal surface 41 without a vertical surface 47. Alternately, longitudinally extending side 40 could be a continuous arc surface.

Referring to FIGS. 4 and 6, conduit means 26 may comprise a continuous longitudinally extending conduit 32 extending from a position above bottom surface 36 through drainage aperture 42 to the next lower trough 28. Conduit 32 has an upper aperture 43 and a lower aperture 45. Reservoir 23 comprises the volume within trough 28 above bottom surface 36 and below lower aperture 45. Conduit 32 may be integrally formed with trough 28 or it may be individually constructed and lockingly inserted into trough 28 such as by means of glue or the like. Conduit 32 may be of any dimension, size or shape, so long as it functions as a conduit. When the level of liquid and other materials in the reservoir of a first trough 28 rises above upper aperture 43 of conduit 32, liquid and other materials will flow into upper aperture 43, downwardly through conduit 32 and out of conduit 32 through lower aperture 45.

Conduit 32 has a sufficient longitudinal length to direct water into the reservoir 23 of the next lower trough 28 without excessive loss and, preferably, without any loss thereof. Accordingly, as shown in FIG. 1 conduit 32 may extend to a position adjacent top 31 of the next lower trough 28. Alternately, as shown in FIGS. 2 and 3, conduit 32 may extend to a position adjacent bottom surface 36 of the next lower trough 28. If trough 28 is adapted to receive a plurality of plant containers 20, then conduit 32 is preferably positioned along the longitudinal extent of trough 28 between the position in which adjacent plant containers 20 are to be received (see FIGS. 2 and 3). Accordingly, liquid and other materials will not drain onto the plants and plant containers 20 in the next lower trough 28. One advantage of this embodiment is that liquid and other materials are much less likely to be deflected away from the next lower trough 28 eg. by wind or by deflecting off the plants in the next lower trough 28. Thus, water damage to the floor or other surfaces below or around the planter system, as well as loss of liquid and other materials from the planter system may be avoided.

A further advantage to channelling overflow liquid and other materials from one reservoir 23 to the reservoir 23 of the next lower trough 28 is that liquid and other materials will be distributed more evenly along the length of the next lower trough 28 and consequently, will be distributed more evenly among the various plants and plant containers 20 in the next lower trough 28. In contrast, if the liquid and other material flowed from the drainage conduit onto a plant or the top of plant containers 20, some or all may be absorbed by, or be evaporated from, the plant or plant containers 20 prior to flowing into the reservoir 23 of the next lower trough 28. Once it has entered reservoir 23, the liquid and other material may be absorbed or otherwise utilized more equally by all plants in the respective trough.

As shown in FIGS. 1, 2, and 3, in the preferred embodiment the lowermost trough also has a conduit 32 to direct overflow water from the reservoir 23 of the lowermost trough 28 to a preselected position. For example, for disposal of the liquid and other overflow materials, the conduit 32 of the lowermost trough 28 could be placed over a drain or a storage reservoir, or conduit 28 could be a flexible hose or the like to connect reservoir 23 of the lowermost trough 28 in flow communication with a drain distal to the modular planter system. Alternately, drainage aperture 42 of the lowermost trough 28 could be positioned above such a drain or storage reservoir. In a further alternate embodiment, conduit 32 of the lowermost trough 32 could be used in conjunction with a variety of systems which could recycle or reuse the overflow liquids and other materials by any means known in the art. For example, a hose or other continuous fluid transfer means could be attached to a lower-most drainage conduit and also attached to a pumping means which could cycle the liquid and other materials from the drainage conduit back into the uppermost trough.

Figure 8:
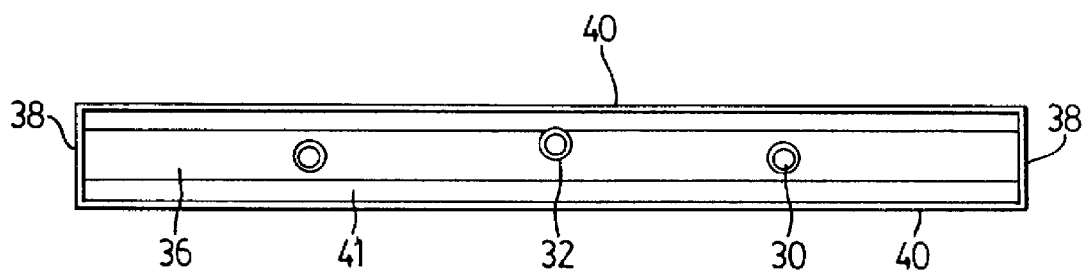
FIG. 8 is a top plan view of the trough of FIG. 7.

Conduit 32 is positioned so as to at least partially fill the reservoir 23 of the next lower trough 28 prior to water draining through the conduit 32 of the next lower trough 28 to the subsequent next lower trough 28. Accordingly, as shown in FIG. 8, conduit 32 may be transversely offset from the center of the bottom 36 of trough 28, eg so that it is positioned adjacent the rear longitudinal side 40. Conduit 32 of the next lower trough 28 may also be transversely offset but on the opposed side, eg so that it is positioned adjacent the front longitudinal side 40. Thus overflow liquid and other materials may flow into the reservoir 23 of the next lower trough 28 as opposed to flowing directly into conduit 32 of the next lower trough 28. Each trough 28 may be of identical manufacture. In assembling the modular planter system, every other trough 28 may be rotated 180° in the horizontal plane so as to offset each successive conduit 32. Conduit 32 may be offset relative to vertically adjacent conduits 32 in other manners.

Figure 5:
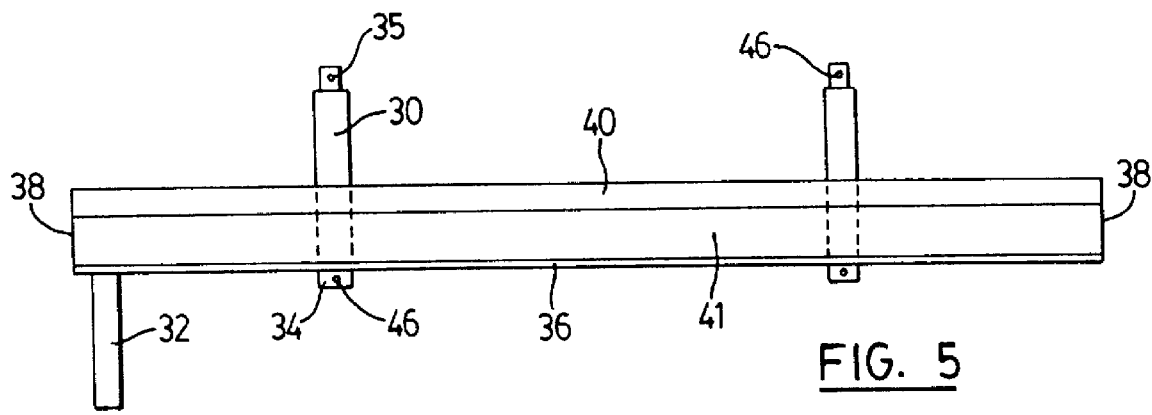
FIG. 5 is a front view of a trough of FIG. 4.

Preferably, as shown in FIGS. 1, 4 and 5, successive conduits 32 are longitudinally offset such that overflow liquid passing through a conduit 32 must travel at least part way along the reservoir 23 of the next lower trough 28 prior to entering conduit 32 of the next lower trough 28. More preferably each conduit 32 is positioned proximal to an end wall 38 such that overflow liquid passing through a conduit 32 must travel substantially along the entire length of reservoir 23 of the next lower trough 28 prior to entering conduit 32 of the next lower trough 28. Each trough 28 may be of identical manufacture. In assembling the modular planter system, every other trough 28 may be rotated 180° in the horizonal plane so as to longitudinally offset each successive conduit 32.

The uppermost trough 28 preferably serves as the receptacle to which water and/or a nutrient-bearing substance is added from time to time. The adding of liquid and other materials could be achieved by, and regulated by, any means known in the art. For example, drainage conduit 32 of the uppermost trough 28 could be modified to regulate the flow of nutrient bearing liquid 28 by, for example, choosing a specific diameter for drainage conduit 32 or, for example, use of a sponge or a cellulose filler which is received by drainage conduit 32. Alternatively, the flow of liquids and materials into the modular planter system could be regulated by an external system, for example, a pump with a regulator means. This embodiment could also be used in conjunction with a means of adding plant nutrients to the liquid, for example, a drip feeder which feeds into the upper most trough.

When liquid and other materials, such as nutrients for plants, are added to the uppermost trough 28 of the modular planter system, the liquid and other materials will flow from the uppermost trough 28 to the lowermost trough 28 in a sequential manner. It will be appreciated that each reservoir 23 could optionally drain to one or more lower troughs 28. In the embodiment of FIGS. 1, 4 and 5, the liquid and other materials will flow along the length of each trough 28 in a sequential manner to provide a cascade-type flow which may provide a consistent and even distribution of nutrient bearing liquids throughout the modular planter system.

When the drainage conduit is proximal to one end wall 38 of the trough, as illustrated in s 1, 4 and 5, the present invention is particularly suitable for use with a hydroponic growth system in which a liquid nutrient supply is continuously circulated throughout the system, thus supplying plants with a consistent and even distribution of nutrients.

Support means 30 serves as connecting means between troughs 28 and may comprise a plurality of interconnecting vertically extending members having an upper end 35 and a lower end 34. The vertically extending members are preferably of a sufficient length to space each trough 28 a preselected distance below the bottom of the next higher trough so as to provide an open vertically extending area of sufficient height to accommodate the growth of a preselected plant. It will therefore be appreciated that successive vertically extending members may be of varying lengths. The vertically extending members may be hollow, or it may be solid.

When the modular planter system is assembled, the vertically extending members will comprise a continuously extending system for positioning troughs 28 at a desired vertical spacing.

Figure 9:
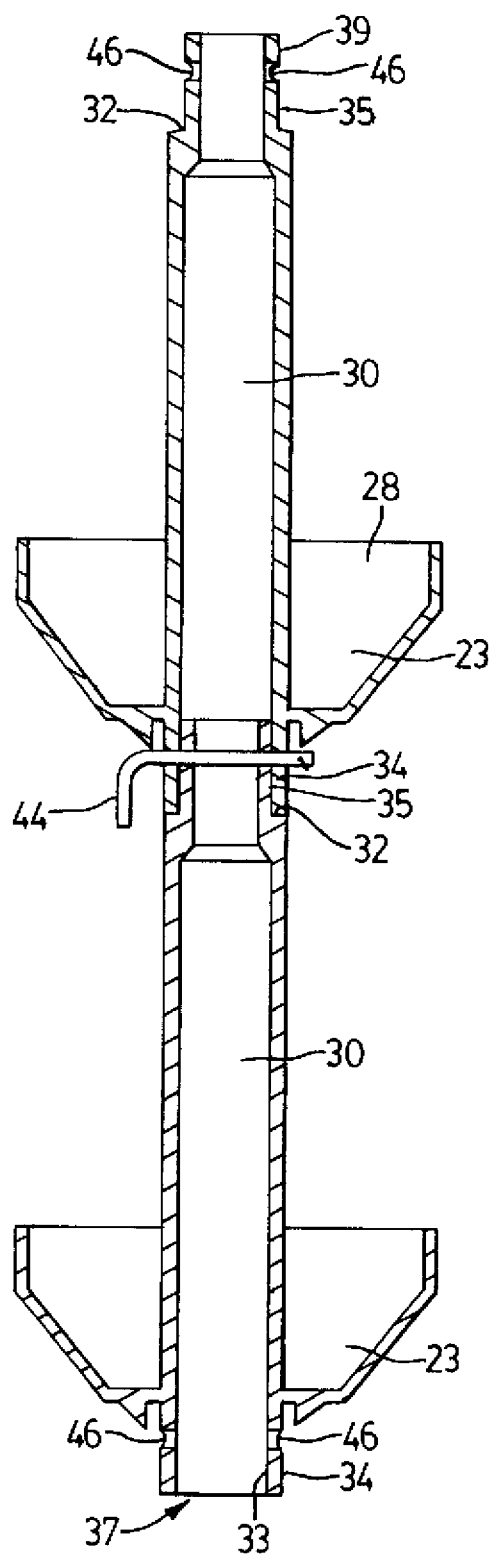
FIG. 9 is a cross-sectional view along the line A—A of FIG. 3.
Figure 10:
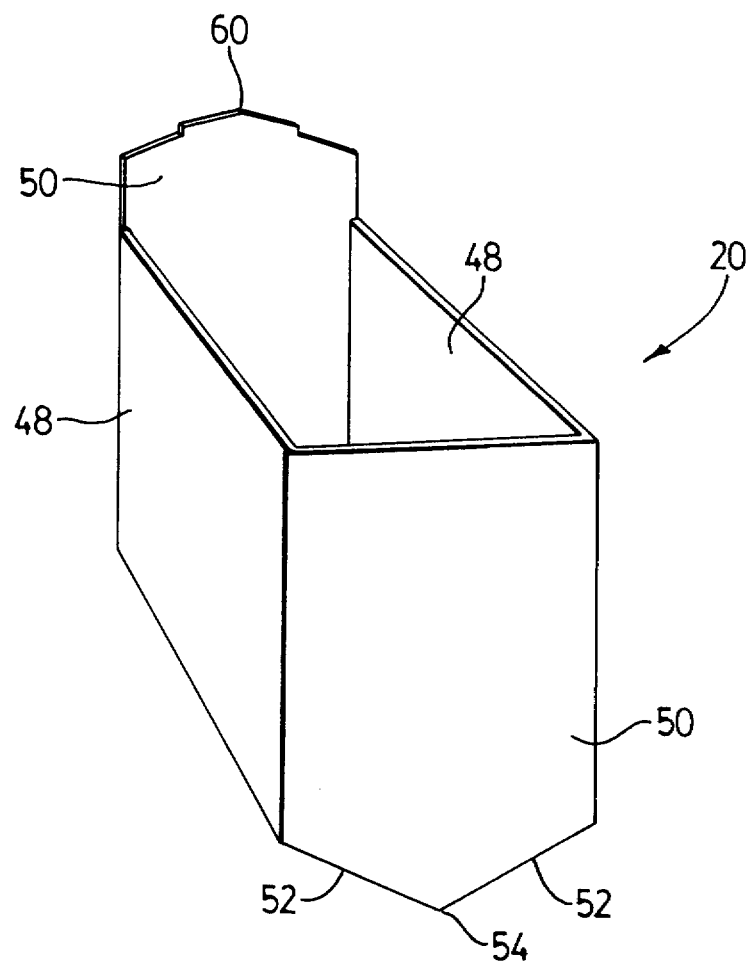
FIG. 10 is a perspective view of a plant container.

The vertically extending members may be connected together by any means known in the art. In one embodiment of the present invention, the support members may be connected by means of male-female engagement means. As shown in FIG. 9, upper end 35 of each vertically extending member may be a male member sized to be lockingly received in female, lower end 34 of another vertically extending member. Male end 35 has a recessed vertically extending surface 39. Female end 34 has an opening 37 having an annular inner surface 33. Opening 37 may be sized to lockingly receive, such as by an interference fit, male end 35. Alternately, male end 35 may be secured in opening 37 by mechanical means such as by glue or the like.

In another embodiment, male and female ends 35 and 34 may be provided with aligned apertures 46 which are adapted to receive a locking pin 44 to securely lock mated vertically extending members together and to ensure that the attached troughs are fixed in a desired relationship. Other suitable connection means known in the art which may be used include mating threads, spring clip fasteners and set screws.

In the embodiment illustrated in FIG. 4, the support means 30 is secured to bottom surface 36 of trough 28 and extends vertically upwards and downwards from bottom surface 36. Support means may be integrally formed with trough 28. It will be appreciated that in other embodiments of the invention support means 30 may be secured to and extend from longitudinally extending sides 40 or end walls 38. Alternately, troughs 28 and support means 30 may be constructed separately, and later assembled by, for example, a screw thread relationship or a seated relationship in combination with an adhesive means.

By providing a kit having troughs with interchangeable vertically extending members and conduits 32 and by supplying vertically extending members and conduits 32 of varying lengths, the user of the modular planter system may modify the height between successive troughs 28 by selecting vertically extending members and conduits 32 of the desired length. Alternately, if the vertically extending members had a plurality of aligned openings 46, then the height between successive troughs 28 could be adjusted by cutting vertically extending members and conduits 32 to the desired length.

Figure 7:
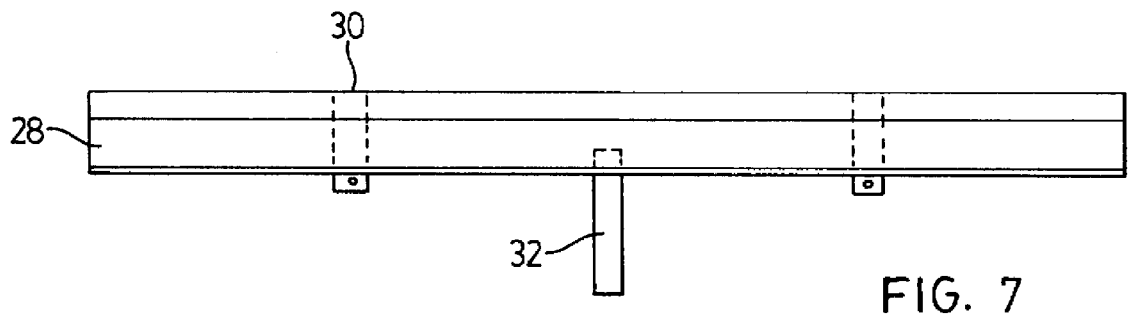
FIG. 7 is a front view of the uppermost trough of FIG. 2.

As shown in FIGS. 1 and 7, any trough 28 may be adapted as the uppermost trough 28 by not attaching a vertically extending member to the upper end 35 of the vertically extending members associated with the trough 28.

A preferred embodiment of a plant container is illustrated in FIGS. 10, 11, 12 and 14. As shown, each plant container 20 has longitudinal sides 48, end walls 50 and bottom surface 52. Reservoir 23 may be an internal channel provided in trough 28. Preferably, reservoir 28 comprises a channel extending between bottom surface 36 of trough 28 and bottom surface 52 of plant container 20. In such an embodiment, upper aperture 43 of conduit 32 is positioned above bottom surface 36 of trough 28. Accordingly, plant containers 20 and troughs 28 may be made a variety of shapes and sizes provided that plant container 20 is received by trough 28 in such a manner as to define a reservoir 23 in which liquid, plant nutrients, and other materials can collect. Each plant container 20 has drainage means for communicating with reservoir 23.

Longitudinal sides 48, end walls 50 and bottom surface 52 of plant container 20 may be solid. Alternatively, they may be mesh-like, or a combination of solid and mesh-like. Where longitudinal sides 48, end walls 50 and bottom surface 52 are mesh-like of partly mesh-like, circulation of air or liquids to the plant may be facilitated.

Figure 11:
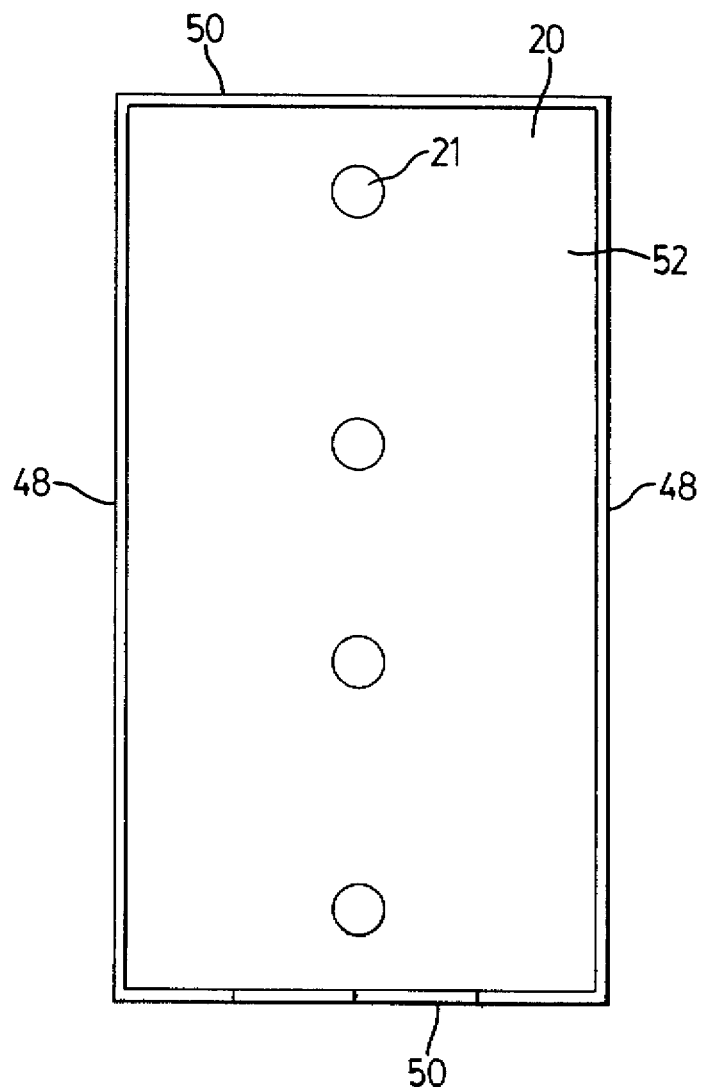
FIG. 11 is a top plan view of a the plant container of FIG. 10.
Figure 12:
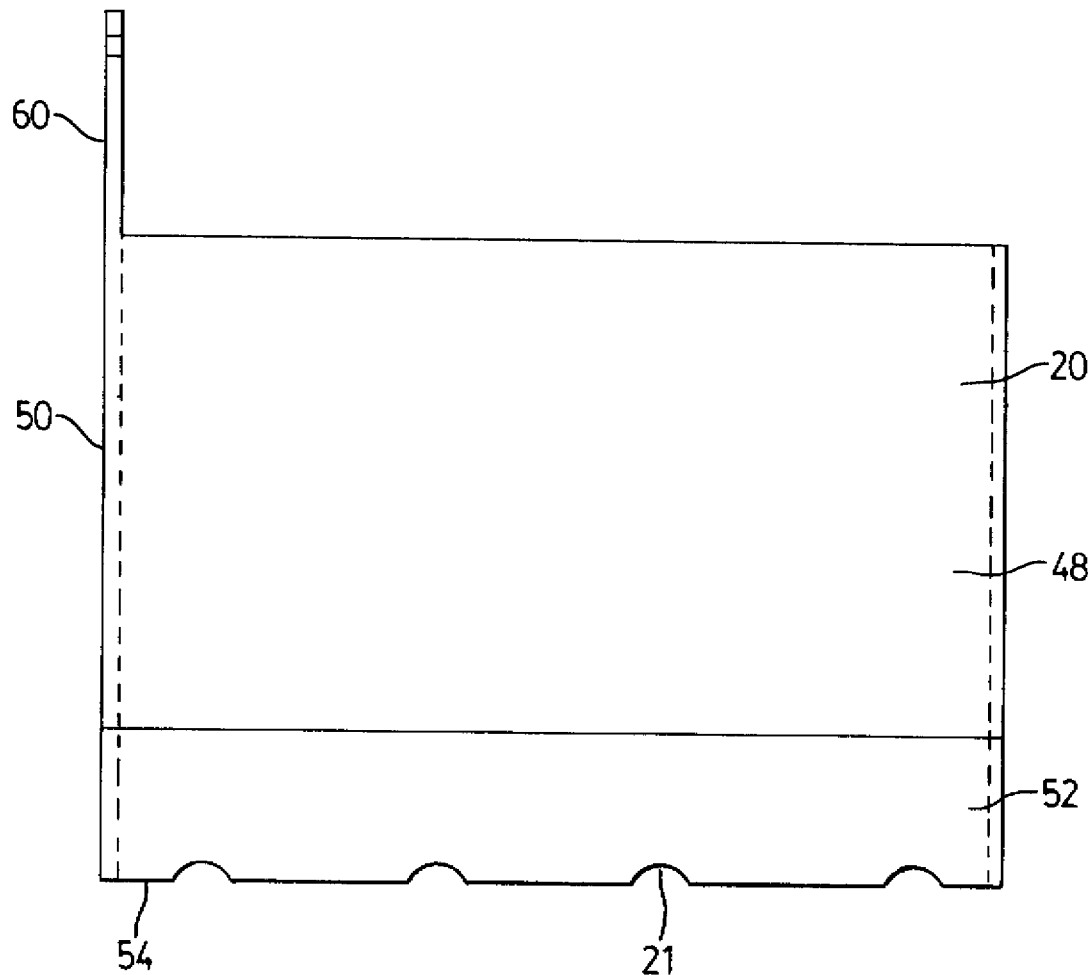
FIG. 12 is a front view of the plant container of FIG. 10.
Figure 13:
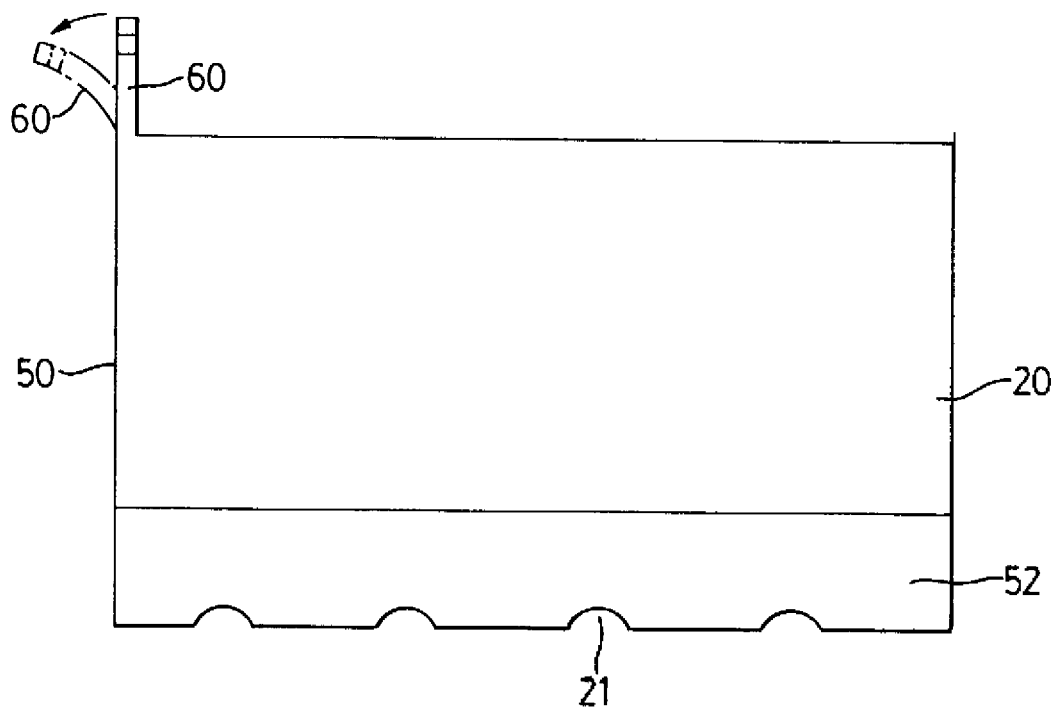
FIG. 13 is a front view of the plant container of FIG. 10, demonstrating the flexing of the flexible locking side portion.

As shown in FIGS. 11, 12 and 13, the drainage means may comprise a plurality of apertures 21 in bottom surface 52 of plant containers 20. It will be appreciated that when plant container 20 is positioned in a trough 28, if at least part of at least one aperture 21 of the plant container 20 is below upper aperture 43 of conduit 32, liquids and other materials in the reservoir may enter the plant container, where they can be taken up directly by the plants roots, or indirectly by absorption or adsorption or capillary action into the medium in the plant containers and subsequently taken up by the plant's roots. To this end, bottom surface 52 may comprise two diagonal surfaces which meet at lowermost part 54 of plant container 20. It will be appreciated that a variety of sizes, shapes, quantities and positioning of drainage apertures can be used. Alternately, large apertures could be used in combination with, for example, a filter. The filter may, for example, be in the form of a nylon gauze, having for example a one sixteenth inch or one thirty-second inch mesh. It will be appreciated that any of a number of drainage systems and permeable surfaces known in the art may be used.

It will further be appreciated that, due to the close proximity of reservoirs 23 to plant containers 20, liquid and other materials in reservoir 23 may be taken up by the growth medium in the plant containers by, for example, absorption, adsorption, or a capillary action. Alternatively, or additionally, plant roots can extend into reservoir 23 to directly feed from the water and nutrients in the reservoir. In addition, the proximity of the liquid to the plant may assist in maintaining a high humidity level for the plants.

In another embodiment, which may be useful for a hydroponic system, at least one aperture can be placed in each end wall 50 of a plant container 20 such that, when the plant container 20 is received by the trough, at least a part of apertures 21 in end wall 50 are lower than upper aperture 43 (not shown). These apertures 21 may facilitate flow of the liquid and nutrients through the troughs and the plant containers, thus facilitating the delivery of nutrients directly to the roots of the plants in the containers.

Alternatively, the plant containers, or, alternatively, the troughs, may be filled with a growth medium such as soil, or a soil-like medium, for example sand and peat with major and minor trace elements, in accordance with conventional planting practice. In addition, ground-up poly-foam or the like may be provided in the bottom of each of the troughs, to further enhance the growing environment in the modular planter system by serving as thermal insulation.

Figure 14:
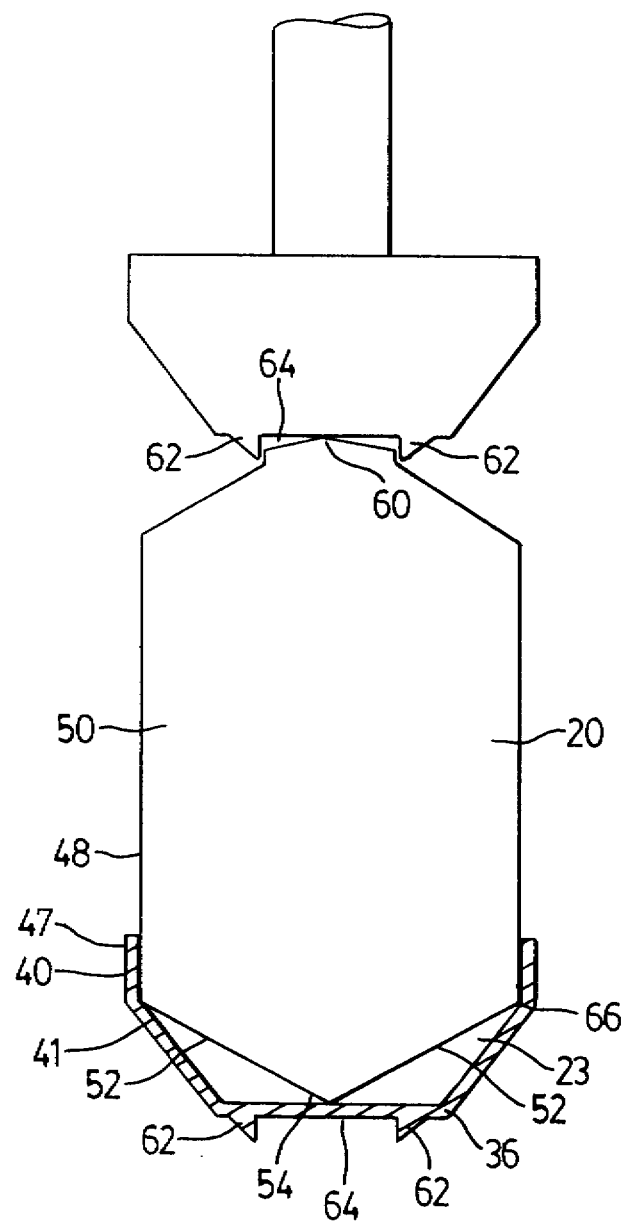
FIG. 14 is a cross-sectional view along the line B—B of FIG. 3.
Figure 15:
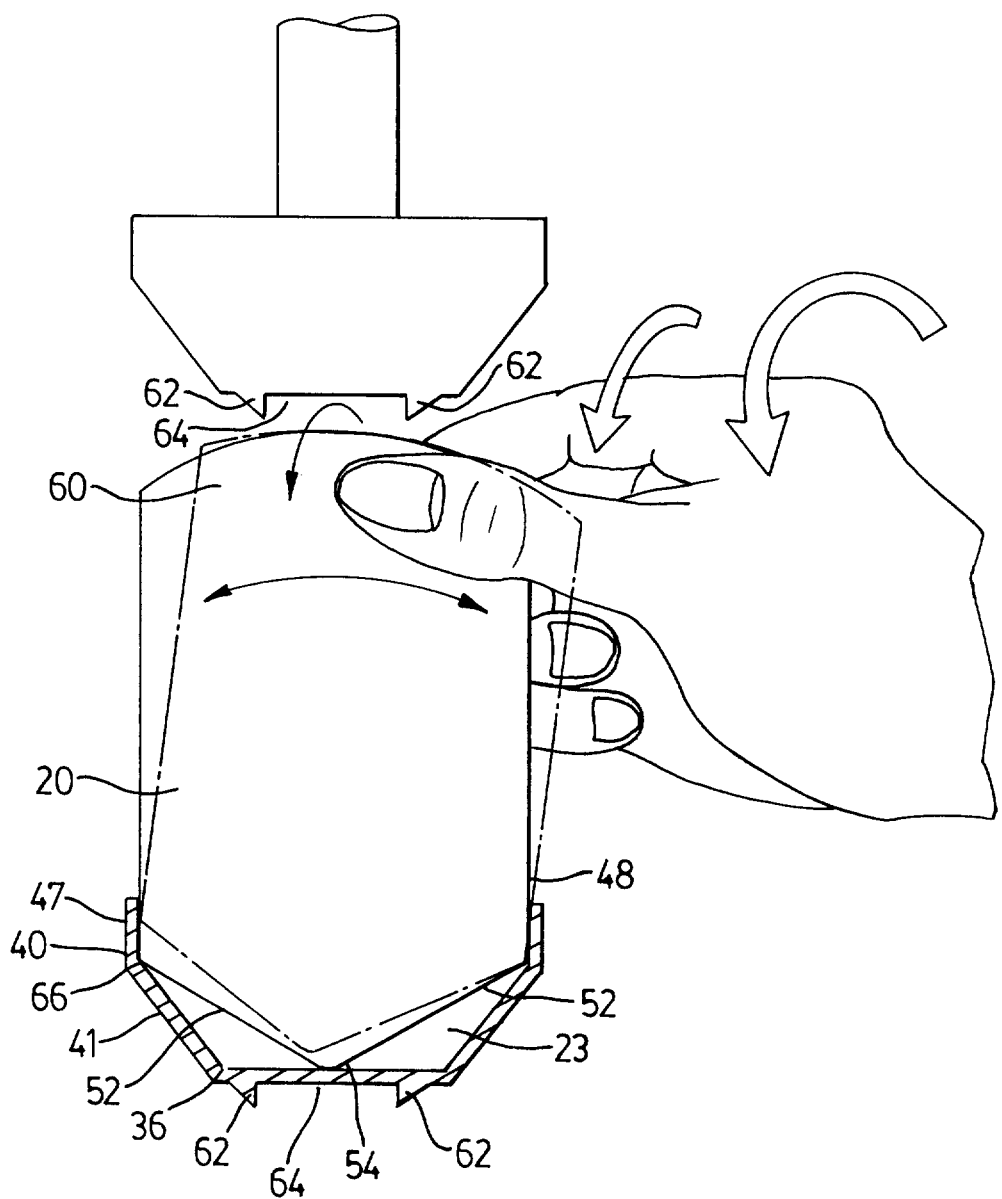
FIG. 15 is a cross-sectional view along line B—B of FIG. 3, demonstrating the insertion of a plant container into a trough.

In a preferred embodiment, the modular planter system comprises locking means for securing, and preferably releasably securing, plant containers 20 in troughs 28. The locking means may comprise male and female engagement means. As shown in FIGS. 13, 14, and 15, the locking means may comprise a flexible panel 60 extending upwardly from an end wall 50 of plant container 20 and mating recess 64 positioned between projections 62 which extend downwardly from bottom surface 36 of trough 28. When plant container 20 is received in a trough 28, the size and shape of panel 60 is such as to allow panel 60 to be secured within recess 64 on the underside of the next successive upper trough 28. Projections 62 prevent the plant container from being inadvertently displaced from trough 28. Thus plant container 20 is secured in its position in the planter system.

Preferably, panel 60 is made from a resilient material allowing panel 60 to be deformed outwardly away from end wall 50 as shown in dotted outline in FIG. 13. In order to insert a plant container 20 in a trough 28, panel 60 may be deformed to the position shown in dotted outline in FIG. 13. Plant container 20 may then be placed in a selected trough 28. Thus panel 60 will not engage projections 62 as plant container 20 is positioned in trough 28. Once the plant container is received in a trough 28 in an upright position, panel 60 may be released allowing panel 60 to resume its molded shape, thereby securing panel 60 between projections 62 of the next upper trough 28. The secured, upright position of plant container 20 is shown in FIG. 14. Similarly, plant container 20 may be removed from trough 28. In this manner, plant container 20 is easily moved into or out of the modular planter system.

In order to assist in the vertical positioning of plant container 20 in a trough 28, bottom surface 52 of plant container 20 may be adapted to engage the sides or bottom of trough 28. As shown in FIG. 14, the bottom of sides 48 of plant container 20 may be positioned at juncture 66 between vertical surface 47 and diagonal surface 41 of trough 28. The engagement between the lower portion of sides 48 and vertically extending surface 47 assists in maintaining plant container 20 in a generally upright position. Lowermost part 54 of plant container 20 may be in contact with bottom surface 36 of trough 28 to assist in supporting plant container 28 at juncture 66.

While trough 28 may directly receive a plant therein, there are advantages to a modular design in which plant containers 20 are removably received in a trough 28. Plant container 20 and the plants therein may be easily moved to a different position within trough 28, or to another trough 28, if desired. Plants may be easily rearranged within a particular system or removed therefrom without removing any troughs, or uprooting any plants which could otherwise damage the roots of a neighboring plant.

A further advantage of the modular design of the system is that the invention may be assembled from a kit, and may be disassembled. The individual components of the kit may may be constructed with a size and weight such that the components are easily handled by an individual.

The modular planter system may be supported by any means known in the art. Preferably, the modular planter system is adapted to be hung above the ground such as by being hung from a ceiling or other elevated support means or, alternatively, by being secured to a wall or other vertically extending support surface (see FIGS. 2 and 3).

Referring to FIG. 2, support means 30 is hollow and a continuous hanging means 18, such as a rope, twine, chain, wire or the like extends through support means 30 and is secured at lower ends 34 below lowermost trough 28 by, for example, a knot in the rope. The modular planter system may be hung by a hanging means, such as a hook 24 affixed to a wall or a ceiling member, which engages the rope at a position above the uppermost trough 28. In this embodiment, it will be appreciated that the vertically extending members of securing means 30 need not be secured together, but may only abut, as once hung, the rope will maintain the vertically extending members in contact with each other. Additional fastening means, such as brackets, ropes, twine, chains or the like may be attached to the modular planter system as necessary to stabilize the modular system.

As shown in FIG. 3, the uppermost trough 28 may be attached to a vertical surface, for example a wall, by a support means, for example brackets 56 which has a first end secured to the wall and a second end adapted to receive and support a trough 28. The other troughs 28 may be affixed to the system by support means 30 such as is illustrated in FIG. 9.

In addition to the two modular planter system support means illustrated, it may be readily obvious to one skilled in the art that other modular planter system support means could be used to provide suitable support for the modular planter system without departing from the spirit of the invention. For example, the modular planter system could use a base which would provide a floor support means.

Troughs 28 and plant containers 20 may be molded from a lightweight, high strength plastic. The plastic materials may be flexible so as to permit panel 60 to flex. Alternatively, the components of the invention could be made from other materials, for example other moldable polymers or from metal or fiberglass.

The modular planter system in accordance with the invention may be adaptable for indoor, outdoor or greenhouse environments. In greenhouses, for example, it may be employed for plant propagation, and enables efficiency in the use of floor space, and efficiency in energy expenditure for lighting and heating due to the vertical alignment of the plants. The invention may also be employed for aesthetic purposes. For example, when the plant containers are filled, the foliage of the plants may grow to cover the modular planter.

The modular planter system as described may offer versatility in forming spacial arrangements and yet may also be easily assembled into any desired spacial arrangement. Each plant container may be removed and rotated within its respective trough or moved to another trough, and each individual trough may be removed or added to the overall modular planter system as required.

It is to be appreciated that the system may be extended to any desired number and size of plant containers and troughs, depending on the amount of planting space that is desired.

It will be understood that no limitation of the scope of the invention is hereby intended. While the invention has been disclosed and described with reference to a limited number of embodiments, those skilled in the art will appreciate that the various modifications, variations and additions to the process may be made, and it is therefore intended in the following claims to cover each such variation, addition and modification as falls within the true spirit and scope of the invention. Such alterations and further modifications in the illustrated device, and such applications of the principals of the invention as is illustrated herein as would normally occur to one skilled in the art to which the invention relates, are considered as included in the invention.

I claim:

1. A modular planter system comprising:
   (a) an upper longitudinally extending trough, a lower longitudinally extending trough, and a plurality of intermediately positioned longitudinally extending troughs positioned therebetween, each of said troughs having a top, a bottom surface, first and second opposed longitudinally displaced sides, a drainage aperture and a reservoir for storing water;
   (b) a support for positioning said troughs one above another to form a substantially vertically extending series of troughs;
   (c) a drainage conduit extending from the bottom of the upper trough and the bottom of each of the intermediately positioned troughs to a position adjacent the reservoir of the next lower trough for connecting in flow communication the drainage aperture of each of said troughs with the reservoir of the immediately lower trough.

2. The modular planter system as claimed in claim 1 wherein the bottom surface of each trough is spaced above the top of the immediately lower trough so that plants may be planted at any position in said top of each of said troughs.

3. The modular planter system as claimed in claim 1 wherein each of said drainage conduits has one end in communication with the drainage aperture on one trough and a second end in communication with the reservoir of the immediately lower trough, said second end positioned to at least partially fill said reservoir of said one trough prior to the water passing through said drainage conduit to the reservoir of the immediately lower trough.

4. The modular planter system as claimed in claim 1 wherein said drainage aperture of said one trough is positioned adjacent one of said longitudinally displaced sides and the drainage aperture of the immediately lower trough is positioned adjacent the other of said longitudinally displaced sides so that, when water is added to said one trough, the water may travel longitudinally substantially along the length of said trough prior to flowing to the immediately lower trough.

5. The modular planter system as claimed in claim 1 further comprising a plurality of plant containers, each of said troughs is sized to receive at least one plant container, each of said plant containers having a drainage aperture for communicating with said reservoir of the trough in which said at least one plant container is received.

6. The modular planter system as claimed in claim 1 wherein the bottom surface of each of said troughs has a raised portion positioned above the respective bottom surface and said drainage aperture of each trough comprises an opening in the respective raised portion.

7. The modular planter system as claimed in claim 6 wherein said drainage aperture of each of said plant containers comprises at least one opening in the bottom surface of the respective plant container, at least a portion of said at least one opening positioned at a point lower than the respective raised portion of said trough.

8. A kit for assembling at least one modular planter system comprising:
(a) an upper longitudinally extending trough, a lower longitudinally extending trough and a plurality of intermediately positioned longitudinally extending troughs positioned therebetween, each of said troughs having a top, a bottom surface, first and second opposed longitudinally displaced sides, a drainage aperture and a reservoir for storing water;
(b) a support for positioning said troughs one above another to form a substantially vertically extending series of troughs;
(c) a drainage conduit extending from the bottom of the upper trough and the bottom of each of the intermediately positioned troughs to a position adjacent the reservoir of the next lower trough for connecting in flow communication the drainage aperture of each of said troughs with the reservoir of the immediately lower trough.

9. The kit as claimed in claim 8 wherein said drainage conduit has one end adapted to be in communication with the drainage aperture on one trough and a second end is adapted to be in communication with the reservoir of the immediately lower trough wherein, when said kit is assembled, said second end is positioned to at least partially fill said reservoir of said one trough prior to the water passing through said drainage conduit to the reservoir of the immediately lower trough.

10. The kit as claimed in claim 8 wherein said drainage aperture of each of said troughs is positioned adjacent one of said longitudinally displaced sides so that, when assembled, said drainage aperture of one trough is positioned adjacent one of said longitudinally displaced sides and the drainage aperture of the immediately lower trough is positioned adjacent the other of said longitudinally displaced sides whereby, when water is added to said one trough, the water may travel longitudinally substantially along the length of said trough prior to flowing to the immediately lower trough.

11. The kit as claimed in claim 8 further comprising a plurality of plant containers, each of said troughs is sized to receive at least one plant container, each of said plant containers having a drainage aperture for communicating with said reservoir of the trough in which said at least one plant container is received.

12. The kit as claimed in claim 11 wherein each of said plant containers has a bottom surface, and, when assembled, each of said reservoir means comprises at least one longitudinally extending channel extending between the bottom surface of the trough and the bottom surface of the plant containers positioned in said trough.

13. The kit as claimed in claim 11 further comprising a locking member to lockingly engage said plant containers in said troughs.

14. The kit as claimed in claim 8 wherein the bottom surface of each of said troughs has a raised portion positioned above the respective bottom surface and said drainage aperture of each trough comprises an opening the respective raised portion.

15. The kit as claimed in claim 14 wherein said drainage aperture of each of said plant containers comprises at least one opening in the bottom surface of the respective plant container which is positioned so that when said kit is assembled, at least a portion of said at least one opening is positioned at a point lower than the respective raised portion of said trough.

16. The kit as claimed in claim 8 wherein said support comprises a plurality of vertically extending support members, each of said support members having an upper end and a lower end, each of said vertically extending members being affixed to a trough for supporting said trough, the upper end of each vertically extending member adapted to lockingly receive the lower end of another vertically extending support member.

17. The kit as claimed in claim 16 wherein said support members are hollow to receive a flexible line member that may extend therethrough and above said upper trough to define a member which may engage a hanger affixed to a wall or a ceiling.

18. The kit as claimed in claim 8 wherein when said kit is assembled, the bottom surface of each trough is spaced above the top of the immediately lower trough so that plants may be planted at any position in said top of each of said troughs.

19. A kit for assembling at least one modular planter system comprising:
(a) a plurality of longitudinally extending troughs, each of said troughs having a top, a bottom surface, first and second opposed longitudinally displaced sides, a drainage aperture and a reservoir for storing water;
(b) a plurality of plant containers, each of said troughs is sized to receive at least one plant container, each of said plant containers having a drainage aperture for communicating with said reservoir of the trough in which said at least one plant container is received and a locking member to lockingly engage said plant containers in said troughs;

(c) a support for positioning said troughs one above another to form a substantially vertically extending series of troughs; and, (d) a drainage conduit for connecting in flow communication the drainage aperture of each of said troughs with the reservoir of the immediately lower trough.

20. The kit as claimed in claim 19 wherein a portion of each of said drainage conduits is positioned in a trough and exterior to the plant containers in said trough.

21. A kit for assembling at least one modular planter system comprising:

(a) a plurality of longitudinally extending troughs, each of said troughs having a top, a bottom surface, first and second opposed longitudinally displaced sides, a drainage aperture and a reservoir for storing water;

(b) a plurality of plant containers having a bottom, each of said troughs is sized to receive at least one plant container, each of said plant containers having a drainage aperture for communicating with said reservoir of the trough in which said at least one plant container is received, and, when assembled, each of said reservoirs comprises at least one longitudinally extending channel extending between the bottom surface of the trough and the bottom surface of the plant containers positioned in said trough;

(c) a support for positioning said troughs one above another to form a substantially vertically extending series of troughs; and, (d) a drainage conduit for connecting in flow communication the drainage aperture of each of said troughs with the reservoir of the immediately lower trough.

\* \* \* \* \*